United States Patent
Kirchen et al.

(10) Patent No.: US 10,301,015 B2
(45) Date of Patent: May 28, 2019

(54) SYSTEM FOR SHIMMING BLADE FOLD ANGLE ABOUT AN AXIS OF ROTATION

(71) Applicant: SIKORSKY AIRCRAFT CORPORATION, Stratford, CT (US)

(72) Inventors: Adrial Kirchen, Stamford, CT (US); Jonathon Crim, Milford, CT (US); Steven M. Capelle, Derby, CT (US); Stephen V. Poulin, Milford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 283 days.

(21) Appl. No.: 15/329,431

(22) PCT Filed: Jun. 19, 2015

(86) PCT No.: PCT/US2015/036711
§ 371 (c)(1),
(2) Date: Jan. 26, 2017

(87) PCT Pub. No.: WO2016/053410
PCT Pub. Date: Apr. 7, 2016

(65) Prior Publication Data
US 2017/0217580 A1 Aug. 3, 2017

Related U.S. Application Data

(60) Provisional application No. 62/040,184, filed on Aug. 21, 2014.

(51) Int. Cl.
*B64C 27/50* (2006.01)
*B64C 27/46* (2006.01)
(Continued)

(52) U.S. Cl.
CPC ............. *B64C 27/50* (2013.01); *B64C 27/46* (2013.01); *B64C 27/473* (2013.01); *B64C 27/54* (2013.01)

(58) Field of Classification Search
CPC ......... B64C 27/50; B64C 27/46; B64C 27/54; B64C 27/473
(Continued)

(56) References Cited

U.S. PATENT DOCUMENTS 2,950,767 A * 8/1960 Lemont, Jr. ............. B64C 27/50
416/143
3,247,907 A * 4/1966 Mosinskis ............... B64C 27/50
416/105

(Continued)

OTHER PUBLICATIONS

International Search Report and Written Opinion; International Application No. PCT/US2015/036711; International Filing date: Feb. 11, 2016; dated Feb. 23, 2016; 13 pages.

*Primary Examiner* — Dominick L Plakkoottam
(74) *Attorney, Agent, or Firm* — Cantor Colburn LLP

(57) ABSTRACT

A linkage assembly configured for use on a rotor blade having a first section and a second section, the second section being configured to rotate about a blade fold axis between an aligned position and a rotated position relative to the first section is provided. The linkage assembly includes a bracket having a first portion rotatably coupled to the first section about the blade fold axis and a second portion mounted to the second section. A spacer assembly is positioned between the bracket and an adjacent wall of the second section. The overall thickness of the spacer assembly is adjustable to control a distance between the second section and the bracket to adjust the rotated position.

15 Claims, 6 Drawing Sheets

(51) Int. Cl.
*B64C 27/473* (2006.01)
*B64C 27/54* (2006.01)

(58) Field of Classification Search
USPC .................................... 416/134 A, 142, 143
See application file for complete search history.

(56) References Cited

U.S. PATENT DOCUMENTS

| | | | | |
|---|---|---|---|---|
| 3,356,155 | A * | 12/1967 | Ferris | B64C 27/50 |
| | | | | 416/143 |
| 3,438,446 | A | 4/1969 | Vacca et al. | |
| 3,743,441 | A * | 7/1973 | Ferris | B64C 27/50 |
| | | | | 416/143 |
| 4,526,641 | A * | 7/1985 | Schriever | B29C 65/76 |
| | | | | 156/247 |
| 5,400,987 | A | 3/1995 | Ziavras | |
| 5,782,606 | A * | 7/1998 | Mondet | B64C 27/50 |
| | | | | 416/142 |
| 6,036,442 | A * | 3/2000 | Certain | B64C 27/50 |
| | | | | 416/143 |
| 7,530,790 | B2 * | 5/2009 | Cabrera | B64C 27/10 |
| | | | | 416/134 A |
| 2017/0073068 | A1 * | 3/2017 | D'Anna | B64C 27/50 |

* cited by examiner

SYSTEM FOR SHIMMING BLADE FOLD ANGLE ABOUT AN AXIS OF ROTATION

CROSS REFERENCE TO RELATED APPLICATIONS

This application is a National Stage application of PCT/US2015/036711, filed Jun. 19, 2015, which claims the benefit of U.S. Provisional Application No. 62/040,184, filed Aug. 21, 2014, both of which are incorporated by reference in their entirety herein.

STATEMENT REGARDING FEDERALLY SPONSORED RESEARCH OR DEVELOPMENT

This invention was made with government support under contract no. N00019-06-C-0081 awarded by Department of the Navy. The government has certain rights in the invention.

BACKGROUND OF THE INVENTION

Exemplary embodiments of the invention relate to a blade assembly for a rotary wing aircraft, and more particularly, to a blade assembly configured to fold about a blade fold axis.

The flight capabilities of rotary-wing aircrafts make them effective for a wide variety of missions; however, operation of rotary-wing aircraft in certain environments may be limited by the overall structural envelopes thereof. The radial dimensions of a rotary-wing aircraft main rotor assembly results in a rotary-wing aircraft having relatively large structural envelopes which may impact its utility in some environments. For example, space on a ship or vessel is generally at a premium and the structural envelope of a rotary wing aircraft may require a significant allocation of such limited space. Furthermore, strategic and tactical considerations in the military utilization of rotary-wing aircrafts has led to a requirement for rotary-wing aircrafts having main rotor assemblies that may be readily reconfigured for rapid deployment, routine transport, and/or stowage by reducing the structural envelope.

One way to reduce the structural envelope of rotary-wing aircraft to facilitate rapid deployment, routine transport, stowage, and reduce the vulnerability thereof to environmental conditions is to design the main rotor assembly so that the main rotor blades fold relative to the main rotor hub. However, conventional blade folding systems are cumbersome, thereby decreasing the efficiency of the rotary wing aircraft in flight.

BRIEF DESCRIPTION OF THE INVENTION

According to one embodiment of the invention, a linkage assembly configured for use on a rotor blade having a first section and a second section, the second section being configured to rotate about a blade fold axis between an aligned position and a rotated position relative to the first section is provided. The linkage assembly includes a bracket having a first portion rotatably coupled to the first section about the blade fold axis and a second portion mounted to the second section. A spacer assembly is positioned between the bracket and an adjacent wall of the second section. The overall thickness of the spacer assembly is adjustable to control a distance between the second section and the bracket to adjust the rotated position.

In addition to one or more of the features described above, or as an alternative, in further embodiments the linkage assembly includes a linear actuator configured to move in a first direction and a second opposite direction. The linkage assembly is operably coupled to the actuator to rotate the bracket about the blade fold axis.

In addition to one or more of the features described above, or as an alternative, in further embodiments the second section of the rotor blade includes a connector having a first arm rotatably coupled to the first section about the blade fold axis. The connector also includes a second arm configured to selectively couple to the first section.

In addition to one or more of the features described above, or as an alternative, in further embodiments the first arm of the connector includes a rib extending perpendicularly from a planar surface thereof such that the second portion of the bracket is mounted thereto.

In addition to one or more of the features described above, or as an alternative, in further embodiments the first portion of the bracket substantially overlaps the first arm of the connector.

In addition to one or more of the features described above, or as an alternative, in further embodiments the spacer assembly includes a shim having an adjustable thickness configured to contact an adjacent surface of the rib. The spacer assembly also includes a cylindrical spacer configured to contact an adjacent surface of the bracket.

In addition to one or more of the features described above, or as an alternative, in further embodiments the spacer assembly includes a handle. The shim and cylindrical spacer are mounted to opposing surface of the handle.

In addition to one or more of the features described above, or as an alternative, in further embodiments the shim is a peelable shim having a plurality of removable layers.

In addition to one or more of the features described above, or as an alternative, in further embodiments the linkage assembly includes an end link mounted to an end of the first section, a first intermediate link connected to the end link, and a second intermediate link coupled to the first intermediate link and to the bracket.

According to another embodiment of the invention, a rotor blade is provided including a generally hollow first section configured to mount to the rotor hub. A second section includes a spar and a connector mounted to an end of the spar. The connector includes a first arm rotatably coupled to the first section such that the second section is configured to rotate about a blade fold axis between an aligned position and a rotated position. The first arm has a generally planar surface and a rib extending perpendicularly therefrom. A linkage assembly connecting the first section and the second section includes a bracket having a first portion rotatably coupled to the first section about the blade fold axis and a second portion mounted to the second section. A spacer assembly is positioned between the bracket and an adjacent wall of the second section. The overall thickness of the spacer assembly is adjustable to control a distance between the second section and the bracket to adjust the rotated position.

In addition to one or more of the features described above, or as an alternative, in further embodiments the linkage assembly includes a linear actuator configured to move in a first direction and a second opposite direction. The linkage assembly is operably coupled to the actuator to rotate the bracket about the blade fold axis.

In addition to one or more of the features described above, or as an alternative, in further embodiment operation of the actuator in the first direction causes the linkage assembly to extend to a generally linear configuration.

In addition to one or more of the features described above, or as an alternative, in further embodiments operation of the actuator in the second direction causes the linkage assembly to retract to a generally bent configuration.

In addition to one or more of the features described above, or as an alternative, in further embodiments the spacer assembly includes a shim having an adjustable thickness configured to contact an adjacent surface of the rib. The spacer assembly also includes a cylindrical spacer configured to contact an adjacent surface of the bracket.

In addition to one or more of the features described above, or as an alternative, in further embodiments the shim is a peelable shim having a plurality of removable layers.

Technical effects include a folding system for a rotor blade including bracket and a spacer assembly, the thickness of the spacer assembly being configured to control the rotation of the rotor blade about a blade fold axis.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
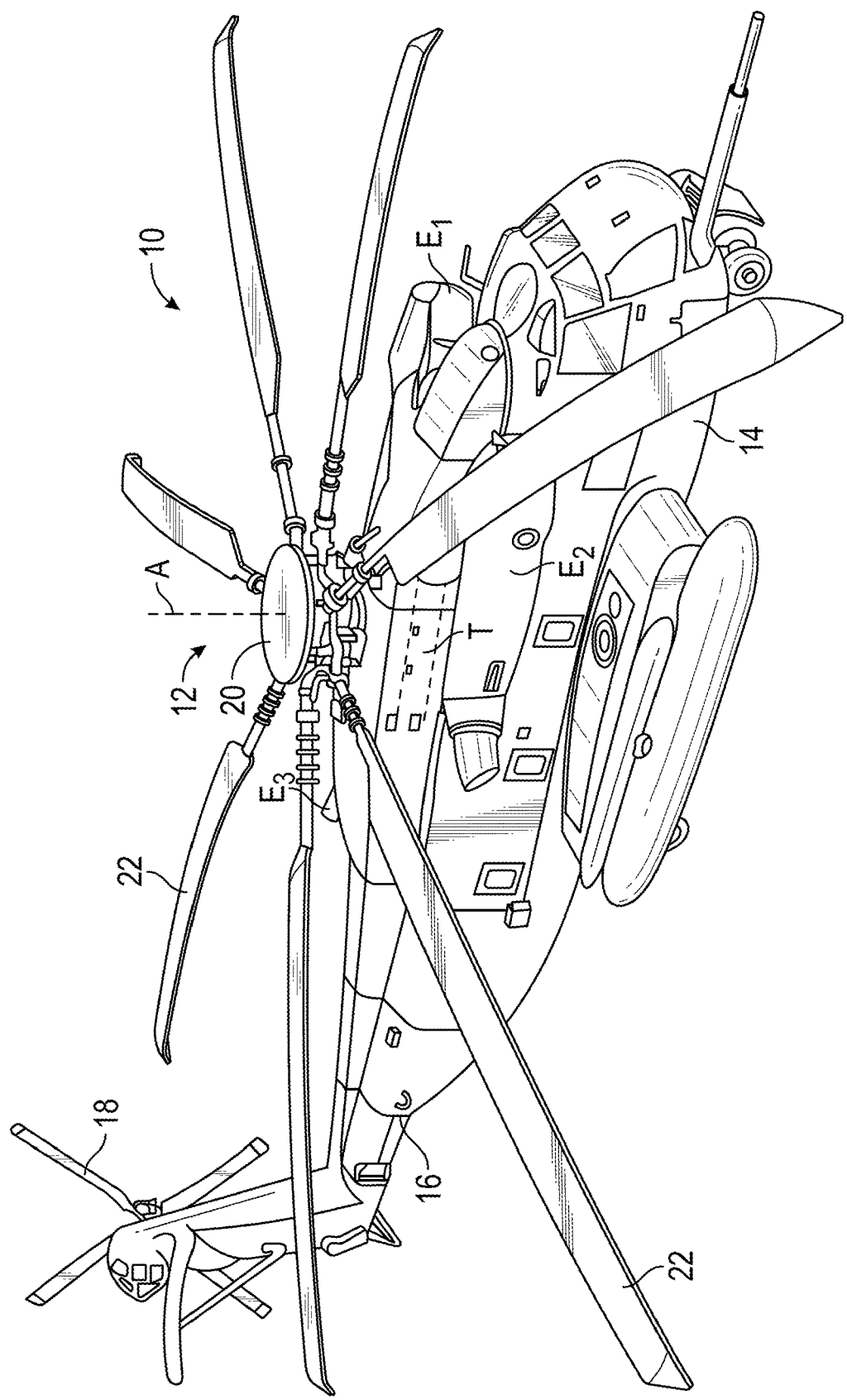
FIG. 1 is a perspective view of an example of a rotary wing aircraft.
Figure 2:
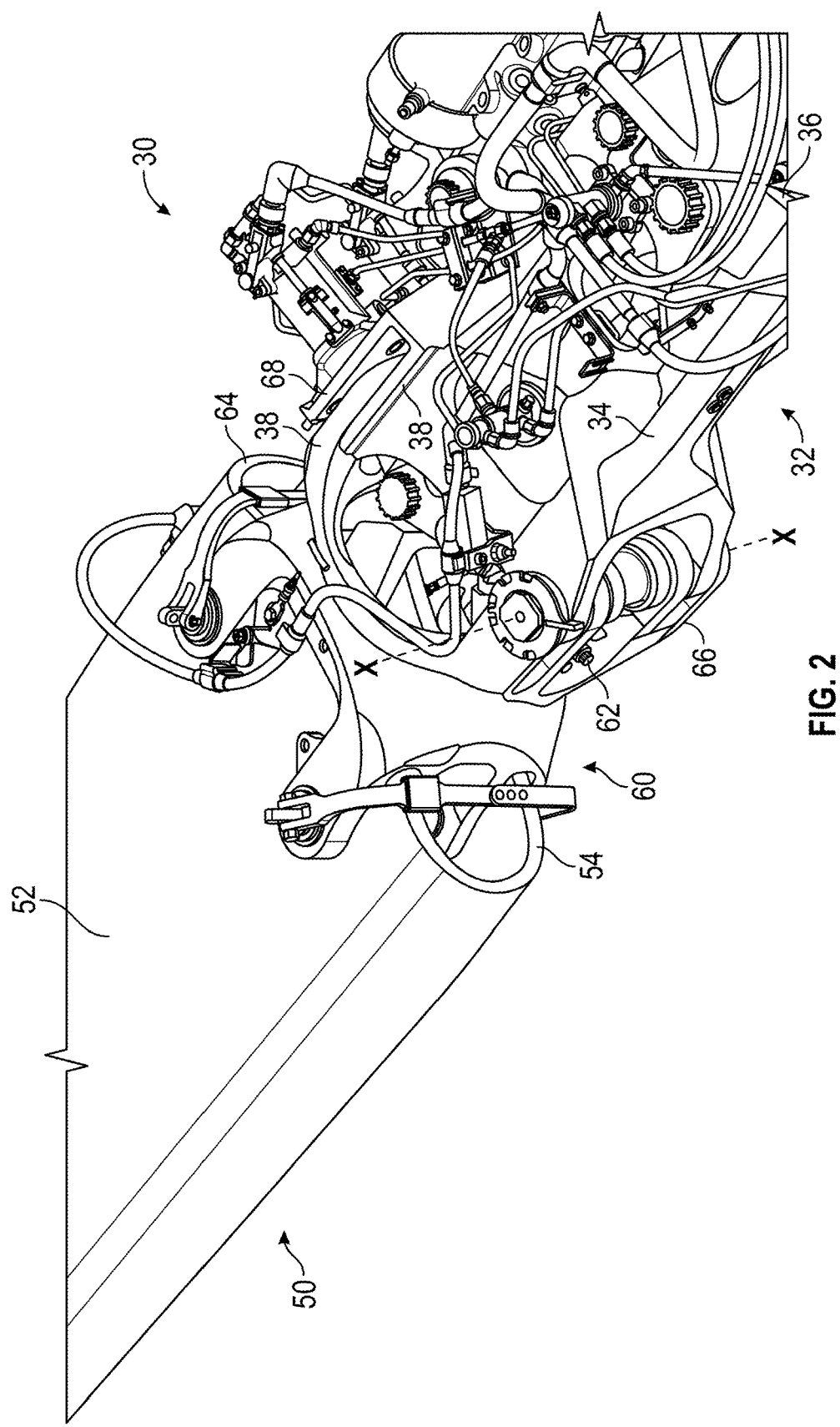
FIG. 2 is a perspective view of a portion of a main rotor blade of the rotary wing aircraft according to an embodiment of the invention.
Figure 3:
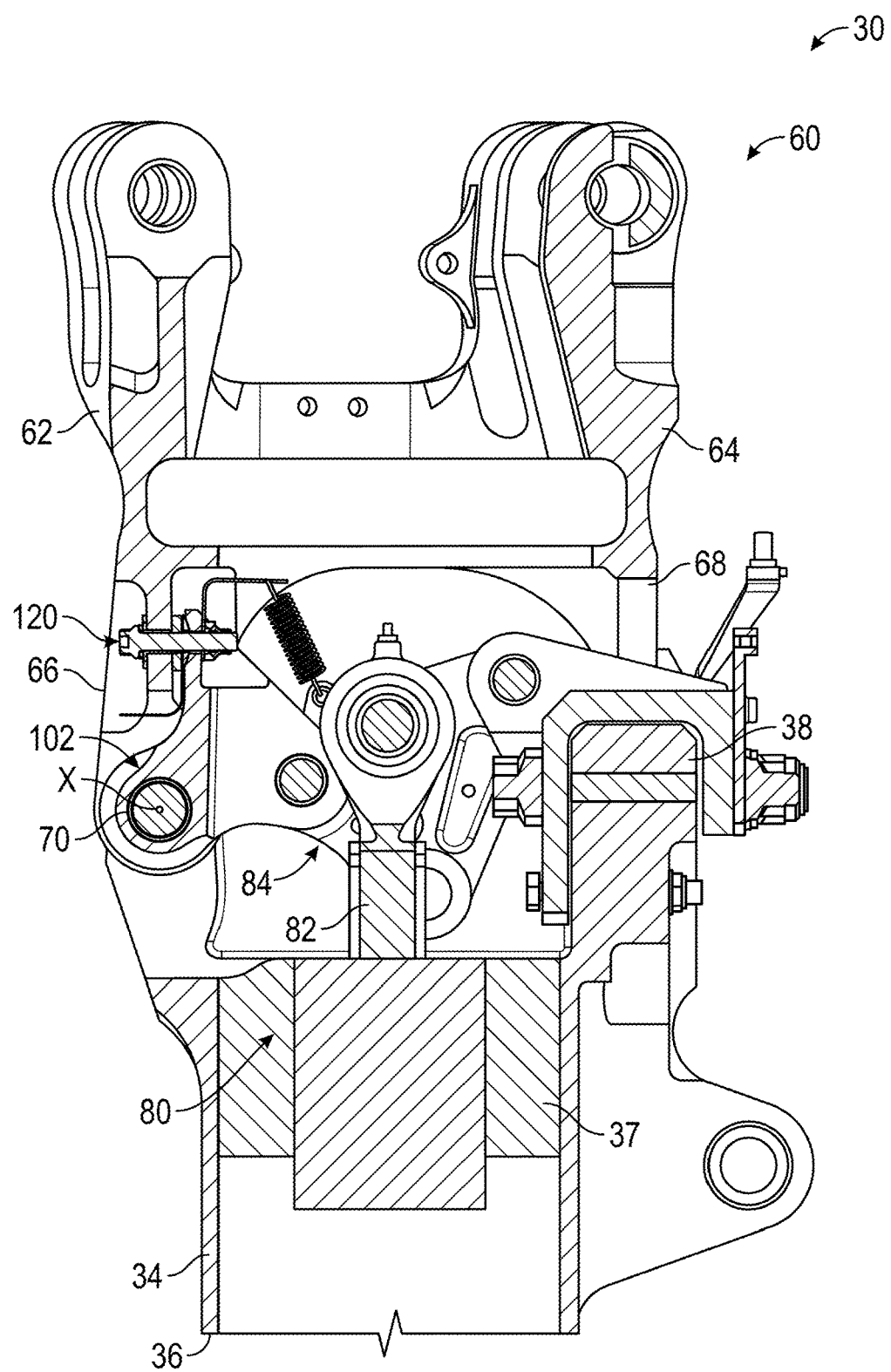
FIG. 3 is a cross-sectional view of a portion of a main rotor blade of the aircraft in an aligned position according to an embodiment of the invention.

FIG. 1 schematically illustrates a rotary wing aircraft 10 having a main rotor assembly 12. The aircraft 10 includes an airframe 14 having an extending tail 16 which mounts a tail rotor system 18, such as an anti-torque system, a translational thrust system, a pusher propeller, a rotor propulsion system, and the like. The main rotor assembly 12 includes a plurality of rotor blade assemblies 22 mounted to a rotor hub 20. The main rotor assembly 12 is driven about an axis of rotation A through a main gearbox (illustrated schematically at T) by one or more engines E. Although a particular helicopter configuration is illustrated and describer in the disclosed embodiment, other configurations and/or machines, such as high speed compound rotary wing aircrafts with supplemental translational thrust systems, dual contra-rotating, coaxial rotor system aircrafts, tilt-rotors and tilt-wing aircrafts, and fixed wing aircrafts, will also benefit from embodiments of the invention.

Referring now to FIGS. 2-7, at least one rotor blade assembly 22 includes a rotor blade 30 configured to fold about a blade fold axis X arranged generally perpendicular to the blade chord. The rotor blade 30 is divided into a first section 32 and a complementary second section 50. The first section 32 includes a generally hollow spindle 34, a first end 36 of which is mounted to the rotor hub 20, such that the spindle 34 extends radially outward from the hub 20.

Figure 4:
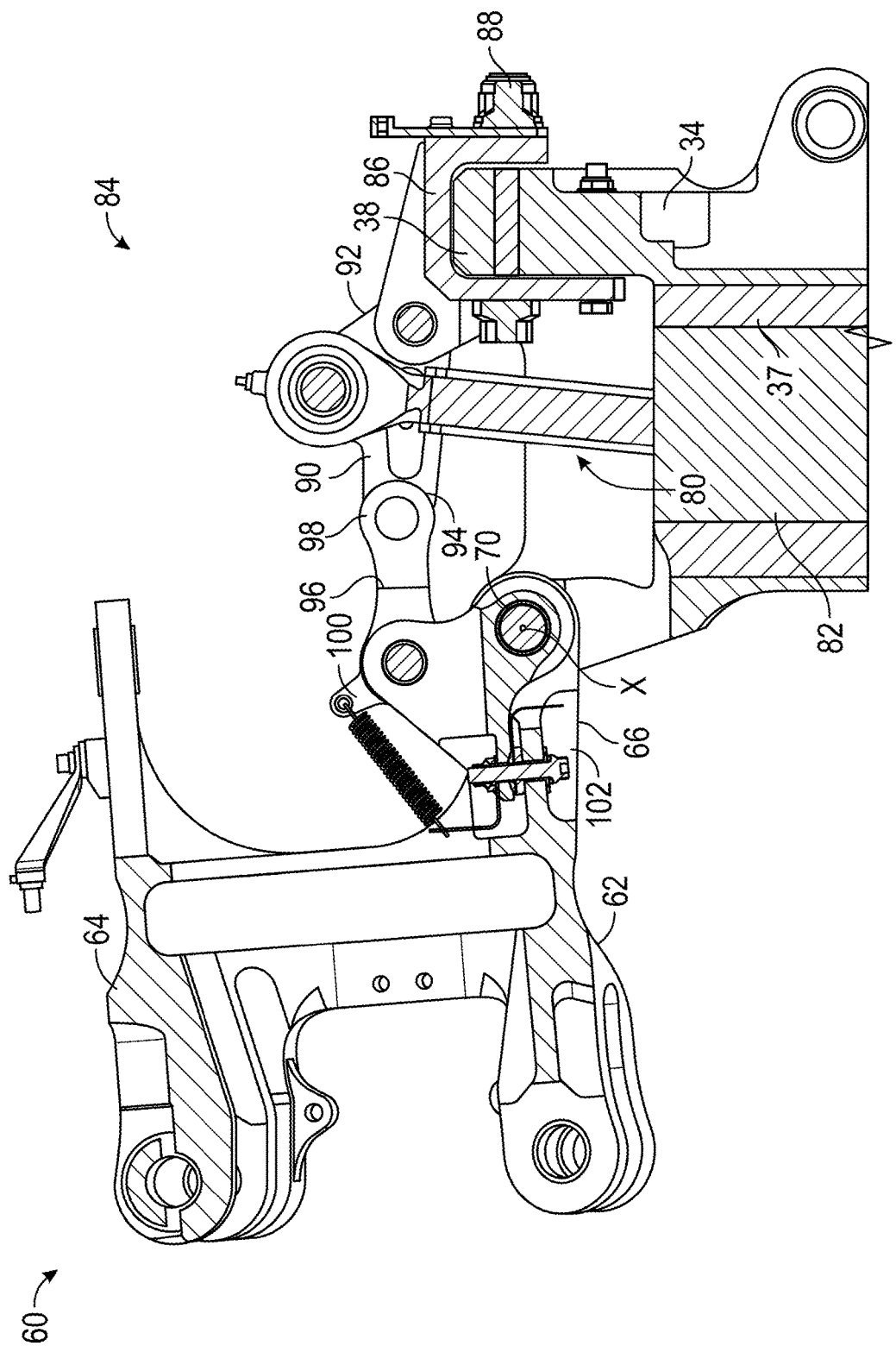
FIG. 4 is a cross-sectional view of a portion of a main rotor blade of the aircraft in a rotated position according to an embodiment of the invention.
Figure 5:
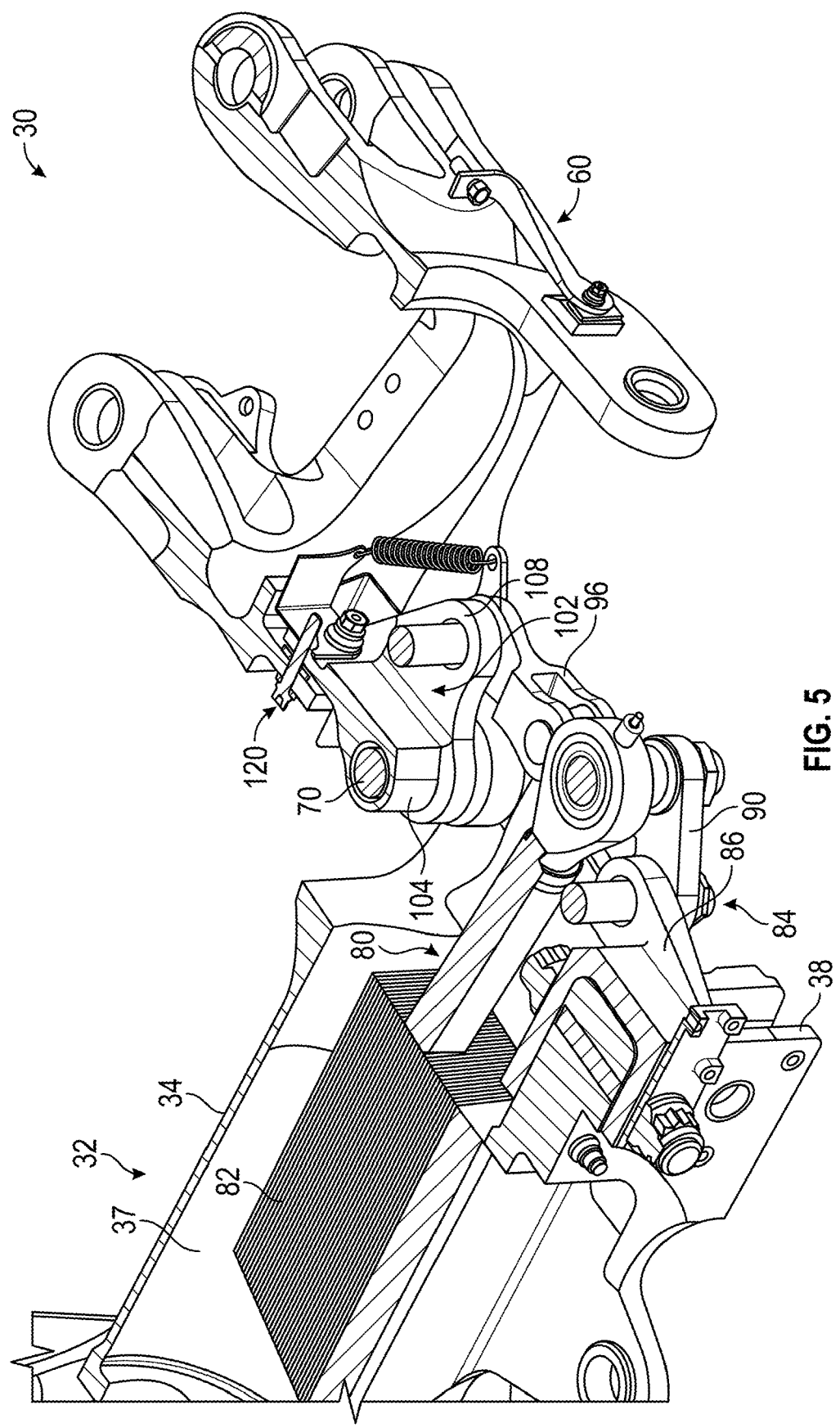
FIG. 5 is a perspective view of a portion of a main rotor blade of the aircraft in a rotated position according to an embodiment of the invention.

The second section 50 of the rotor blade 30 includes a blade spar 52 (see FIG. 2) having a connector 60 coupled to or integrally formed with the end 54 of the blade spar 52 adjacent the first section 30. A first arm 66 arranged adjacent a first side 62 of the connector 60 is rotatably coupled to the second end 38 of the spindle 34 with a fastener 70, such as a pin for example. The blade fold axis X extends through the fastener 70 such that the second section 50 of the rotor blade 30 is configured to rotate to a desired angle about the blade fold axis X, from an aligned position (FIG. 3) to a rotated position (FIG. 4). A second arm 68 arranged adjacent a second, opposite side 64 of the connector 60 is configured to selectively couple to the spindle 34. When the second section 50 of the rotor blade 30 is in the aligned position, a clasp, pin or other fastener (not shown) may couple the second arm 68 of the connector 60 to the spindle 34, to limit the rotation of the second section 50 of the rotor blade 30 about the blade fold axis X to the rotated position. While shown with the fold axis X passing through the fastener 70, it is understood that the fold axis X can be otherwise disposed in other aspects of the invention.

An actuation assembly 80 is mounted to a portion of the rotor blade 30, such as within the hollow interior 37 of the first section 32 for example. The assembly 80 includes an actuator 82, such as a linear or rotational actuator for example, and a linkage assembly 84 operably coupled to the second section 50 of the rotor blade 30. In conjunction with the actuator 80, the linkage assembly 84 is configured to rotate the second section 50 of the rotor blade 30 about the blade fold axis X between the aligned position and the rotated position. As illustrated in the non-limiting embodiment of FIG. 4, the linkage assembly 84 includes an end link 86 mounted to the second end 38 of the spindle 34 with at least one fastener 88. A first end 92 of a first intermediate link 90 is pivotally coupled to the end link 86 and a second end 94 of the first intermediate link 90 is connected to and rotatable relative to a first end 98 of an adjacent second intermediate link 96. A second end 100 of the second intermediate link 96 is attached to a bracket 102 mounted to the connector 60. While shown with an actuator 82, it is understood that other aspects could be include a manual blade fold such that the actuator 82 is not used. Further, other types of linkage assemblies 84 could be used without limitation to the shown assembly.

Figure 6:
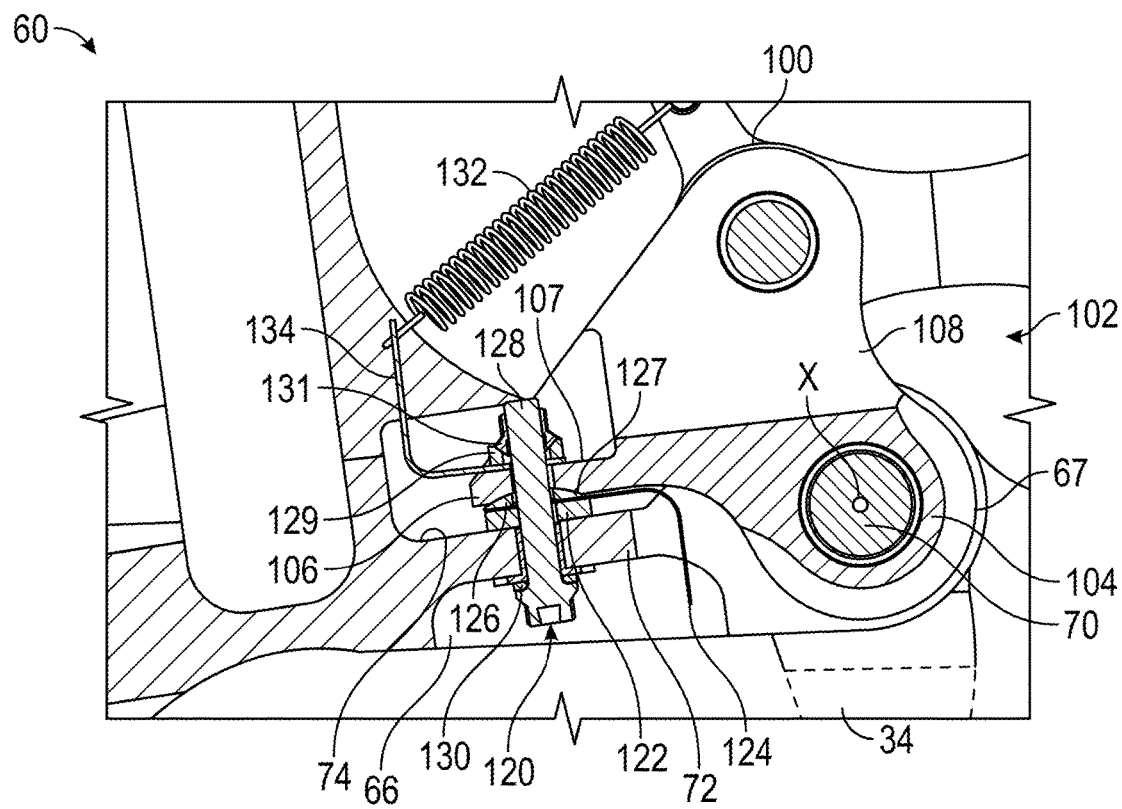
FIG. 6 is a cross-sectional view of a bracket of an actuation assembly of a main rotor blade according to an embodiment of the invention.
Figure 7:
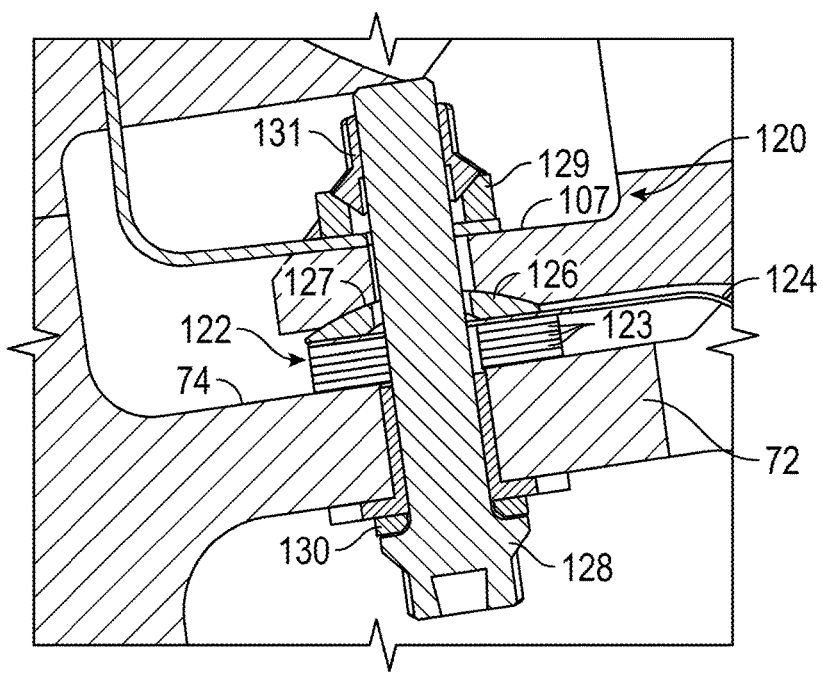
FIG. 7 is a detailed cross-sectional view of the spacer assembly between the bracket and the connector according to an embodiment of the invention.

Referring now to FIG. 6, the bracket 102 coupled to the connector 60 is illustrated in more detail. A first portion 104 of the bracket 102 is arranged adjacent a surface 67 of the first arm 66 such that the pin 70 coupling the first arm 66 and the spindle 34 extends through the first portion 104 and at least partially through the bracket 102. A surface 106 of the bracket, arranged substantially perpendicular to the first portion 104, is mounted to an adjacent, parallel surface 74 of a rib 72 protruding from the first arm 66. As a result, application of a rotational force to either the bracket 102 or the connector 60 causes the second section 50 of the rotor blade 30 to rotate about the blade fold axis X. A portion 108 of the bracket 102 extends generally perpendicularly to the surface 106 in a direction towards the second arm 68 of the connector 60. The second end 100 of the second intermediate link 96 pivotally attaches to this portion 108 of the bracket 102.

Disposed generally between the surface 106 of the bracket 102 and the surface 74 of the rib 72 is a spacer assembly 120 including a shim 122. In the illustrated, non-limiting embodiment, the shim 122 is connected to a handle 124 to facilitate installation of the shim 122 within the interior of the connector 60. In one embodiment, the handle 124 is bent such that the handle 124 is configured to make positioning of the spacer assembly 120 generally mistake proof. However, it is understood that the handle 124 need not be used in all aspects.

The spacer assembly 120 additionally includes a generally cylindrical spacer 126 arranged adjacent the handle 124, opposite the shim 122. The cylindrical spacer 126 may be coupled to or integrally formed with the handle 124. In one embodiment, a concave indentation 127 generally complementary to the contour of the cylindrical spacer 126 is formed in the surface 106 of the bracket 102 such that when the spacer assembly 120 is installed, a portion of the cylindrical spacer 126 is received within the concave indentation 127. A fastener 128, such as a screw for example, extends through the rib 72, the spacer assembly 120, and the surface 106 of the bracket 102 to mount the bracket 102 to the connector 60. A spherical washer 129 and nut 131 positioned about the fastener 130 are configured to couple the fastener 128 to a second, opposite surface 107 of the bracket 102. Additional components, such as washers 130 for example, may be included when installing the fastener 128. A biasing mechanism 132 extends between the second intermediate link 96 and an angle 134, connected to the bracket 102 via the fastener 128. While shown as a spring 132, it is understood that other mechanisms can be used to provide a biasing force in other aspects of the invention.

The rotated position of the second section 50 of the rotor blade 30 is determined by the position of the bracket 102 relative to the connector 60, and more specifically by the distance between the surface 106 of the bracket 102 and the adjacent surface 74 of the rib 72. In one embodiment, the shim 122 of the spacer assembly 120 is a peelable shim having a plurality of substantially identical layers 123. Each of the plurality of layers 123 may have a thickness between about 0.002 and 0.003 inches. The overall thickness of the shim 122, and therefore the rotated position of the rotor blade 30, is adjustable by removing one or more layers 123 from the shim to achieve a desired thickness. The difference between a maximum shim thickness and a minimum shim thickness may result in about a one degree difference in position when then second section 50 of the rotor blade 30 is in the rotated position. While described in terms of peelable shims 123, it is understood that other mechanisms can be used to adjust a thickness of the shim 122 through addition and removal of individual layers to the shim 122 to achieve the desired distance between the surfaces 106 and 74 in other aspects of the invention.

To rotate the second section 50 of the rotor blade 30 about the blade fold axis X from the aligned position to the rotated position, the actuator 82 is operated in a first direction. The movement, such as the linear extension of the actuator 82 towards the connector 60, causes the linkage assembly 84 to rotate to an extended position. As the actuator 82 moves in the first direction, the first intermediate link 90 and the second intermediate link 96 rotate from a generally bent configuration (FIG. 3) to a generally linear configuration (FIG. 4). This extension of the linkage assembly 84 applies a rotational force to the bracket 102, and therefore to the connector 60, causing the second section 50 of the rotor blade 30 to pivot about the blade fold axis X. Similarly, when the second section 50 of the rotor blade 30 is in the rotated position, operation of the actuator 82 in a second direction causes the linkage assembly 84 to fold. As the linkage assembly 84 retracts, the second section 50 of the rotor blade 30 rotates about the blade fold axis X back to the aligned position.

By making the thickness of the shim 122 adjustable, such as by elimination one or more layers 123 thereof, the position of the bracket 102 relative to the second intermediate link 96, and therefore the position of the second section 50 of the rotor blade 30 when rotated about the blade fold axis X may be adapted based on a desired application. Inclusion of the bracket 102 in the linkage assembly 84 allows for a more flexible design, while reducing the weight of the aircraft 10 and the time required to install the linkage assembly 84.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A linkage assembly configured for use on a rotor blade having a first section and a second section, the second section being configured to rotate about a blade fold axis between an aligned position and a rotated position relative to the first section, the linkage assembly comprising:
   a bracket having a first portion rotatably coupled to the first section about the blade fold axis and a second portion mounted to the second section; and
   a spacer assembly positioned between the bracket and an adjacent wall of the second section, wherein an overall thickness of the spacer assembly is adjustable to control a distance between the second section and the bracket to adjust the rotated position.

2. The linkage assembly according to claim 1, further comprising a linear actuator configured to move in a first direction and a second, opposite direction, wherein the linkage assembly is operably coupled to the actuator to rotate the bracket about the blade fold axis.

3. The linkage assembly according to either claim 1, wherein the second section of the rotor blade includes a connector having a first arm rotatably coupled to the first section about the blade fold axis and a second arm configured to selectively couple to the first section.

4. The linkage assembly according to claim 3, wherein the first arm of the connector includes a rib extending perpendicularly from a planar surface thereof such that the second portion of the bracket is mounted thereto.

5. The linkage assembly according to claim 4, wherein the first portion of the bracket substantially overlaps the planar surface of the first arm of the connector.

6. The linkage assembly according to claim 1, wherein the spacer assembly further comprises:

a shim having an adjustable thickness, the shim being configured to contact an adjacent surface of a rib; and a cylindrical spacer configured to contact an adjacent surface of the bracket.

7. The linkage assembly according to claim 6, further comprising a handle, the shim and the cylindrical spacer being mounted to opposing surfaces of the handle.

8. The linkage assembly according to claim 6, wherein the shim is a peelable shim having a plurality of removable layers.

9. The linkage assembly according to claim 1, wherein the linkage assembly further comprises:

an end link mounted to an end of the first section;

a first intermediate link coupled to the end link; and a second intermediate link coupled to the first intermediate link and to the bracket.

10. A rotor blade comprising:

a generally hollow first section configured to mount to the rotor hub, the first section;

a second section including a spar and a connector mounted to a first end of the spar, the connector including a first arm rotatably coupled to the first section such that the second section is configured to rotate about a blade fold axis between an aligned position and a rotated position, the first arm having a generally planar surface and a rib extending perpendicular therefrom; and a linkage assembly connecting the first section and the second section, the linkage assembly including:

a bracket having a first portion rotatably coupled to the first section about the blade fold axis and a second portion mounted to the second section; and a spacer assembly positioned between the bracket and an adjacent wall of the second section, wherein an overall thickness of the spacer assembly is adjustable to control a distance between the second section and the bracket to adjust the rotated position.

11. The rotor blade according to claim 10, wherein the linkage assembly further comprises a linear actuator configured to move in a first direction and a second, opposite direction, the linkage assembly being operably coupled to the actuator to rotate the bracket about the blade fold axis.

12. The rotor blades according to claim 11, wherein operation of the actuator in the first direction causes the linkage assembly to extend to a generally linear configuration.

13. The rotor blade according to claim 12, wherein operation of the actuator in the second direction causes the linkage assembly to retract to a generally bent configuration.

14. The rotor blade according to claim 10, wherein the spacer assembly further comprises:

a shim having an adjustable thickness, the shim being configured to contact an adjacent surface of the rib; and a cylindrical spacer configured to contact an adjacent surface of the bracket.

15. The rotor blade according to claim 14, wherein the shim is a peelable shim having a plurality of removable layers.

* * * * *